Sept. 11, 1923.

E. A. TAYLOR

APPARATUS FOR DISSOLVING SOLIDS

Filed May 23, 1918

1,467,342

INVENTOR
Edward A. Taylor
By Fay, Oberlin & Fay
ATTORNEYS.

Patented Sept. 11, 1923.

1,467,342

UNITED STATES PATENT OFFICE.

EDWARD A. TAYLOR, OF CLEVELAND, OHIO, ASSIGNOR TO THE GRASSELLI CHEMICAL COMPANY, OF CLEVELAND, OHIO, A CORPORATION OF OHIO.

APPARATUS FOR DISSOLVING SOLIDS.

Application filed May 23, 1918. Serial No. 236,120.

*To all whom it may concern:*

Be it known that I, EDWARD A. TAYLOR, a citizen of the United States, and a resident of Cleveland, county of Cuyahoga, and State of Ohio, have invented a new and useful Improvement in Apparatus for Dissolving Solids, of which the following is a specification, the principle of the invention being herein explained and the best mode in which I have contemplated applying that principle, so as to distinguish it from other inventions.

The subject of the present invention is an apparatus for treating a solid material with a liquid, either for the purpose of securing a suspension of the former in the latter or for dissolving the solid in the liquid, the present description referring particularly to one application of this method to the dissolving of silicate of soda, together with a preferred form of apparatus for carrying out this method.

Commercial sodium silicate, which is ordinarily prepared by the fusion of silicious or alkaline materials in a suitable furnace, is a solid material which is practically insoluble in water at ordinary temperatures and under ordinary conditions. For use in various arts it is necessary, however, to dissolve sodium silicate in water, and considerable difficulty has been experienced in effecting this solution on a commercial scale. In fact, it may be said that this has been accomplished commercially only by the employment of comparatively intricate processes, which involve the use of complicated and expensive machinery.

One object of the present invention is a provision of a method of dissolving sodium silicate in water without the use of complicated or expensive machinery and without the use of expensive means of agitating the body during its dissolution. To the accomplishment of the foregoing and related ends, said invention, then, consists of the means hereinafter fully described and particularly pointed out in the claims.

The annexed drawing and the following description set forth in detail certain means and one mode of carrying out the invention, such disclosed means and mode illustrating, however, but one of the various ways in which the principle of the invention may be used.

Figure 1:
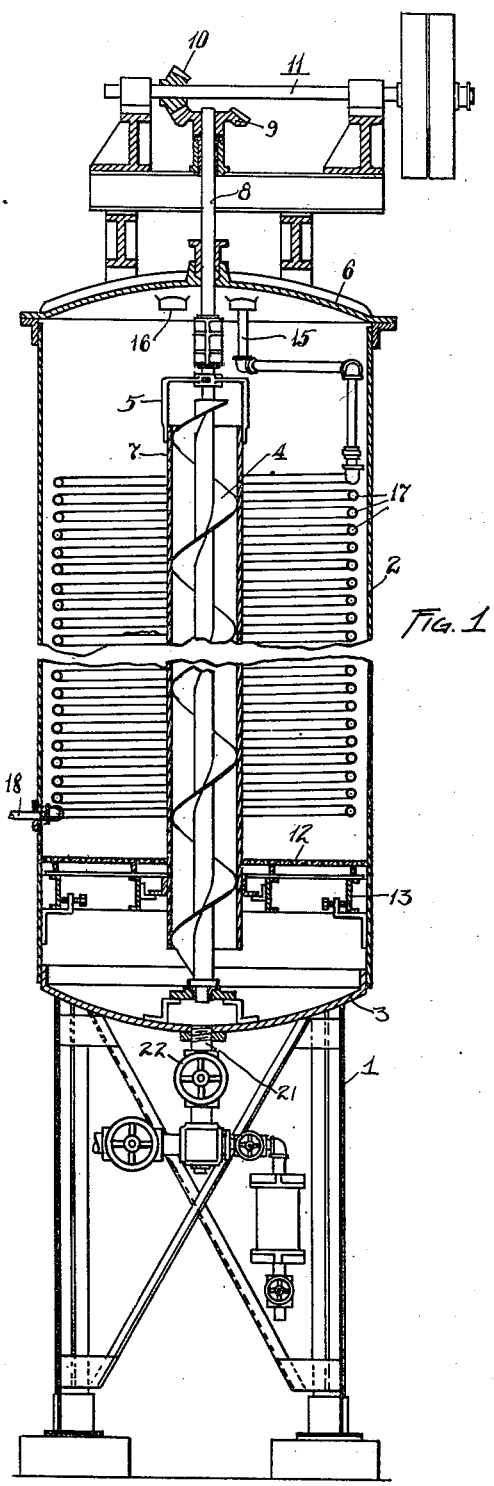
Figure 2:
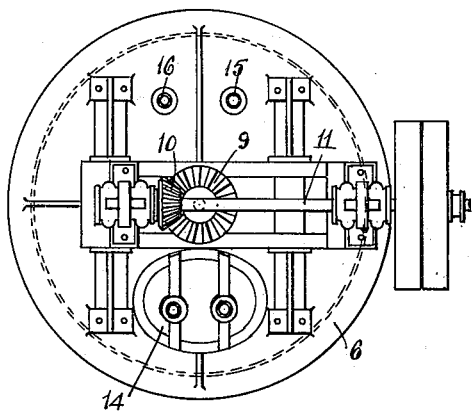
Figure 3:
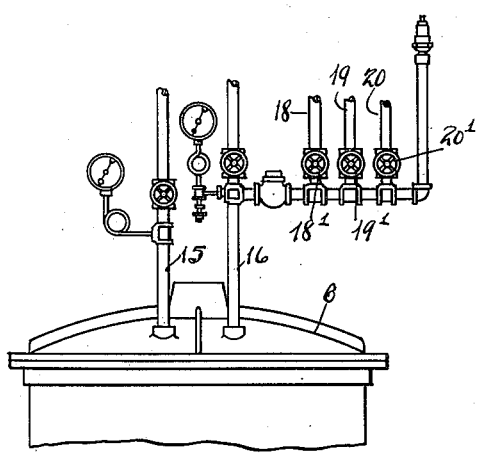

Fig. 1 is a transverse vertical section showing certain parts and connections in elevation; Fig. 2 is a plan view of the apparatus shown in Fig. 1; and Fig. 3 is a side elevation of the upper end of the apparatus, together with the connections.

Referring now to Fig. 1, there is shown a suitable supporting frame 1, upon which is mounted a substantially cylindrical chamber 2 arranged in a vertical position and having a curved bottom 3 upon which there is mounted in suitable bearings an agitating screw 4, which is held at its upper end in a yoke 5 suitably attached to a casing 7. This agitating screw 4 is enclosed in said cylindrical casing 7, which terminates short of the lower and upper end of the agitator and is open at both ends to the interior of the chamber 2. The agitator is driven by means of a shaft 8 extending through the cover 6 and bearing a gear 9 on a driving shaft 11.

Mounted adjacent to the bottom 3 of the cylinder is a screen or grill 12 extending horizontally across the cylinder and serving to support the charge of silicate or other material when it is introduced into the chamber. This grill 12 is suitably supported upon brackets 13 attached to the walls of the cylinder 2. In the top 6 there is an opening which is normally closed by means of a manhole cover 14, and through this opening the charge of silicate is first introduced into the apparatus. Also extending through the cover 6 are two conduits 15 and 16, the first conduit being connected to a coil 17 disposed in the chamber 2 adjacent to the walls of the same. This coil 17 is provided with a drain pipe 18 extending through the side of the chamber and is adapted to have steam pass therethrough during the operation of the apparatus. The other of the two conduits 16 discharges directly into the chamber 2 and is provided with connections 18, 19 and 20, controlled by valves 18', 19', and 20', which are adapted to carry water, steam and air respectively. The bottom of the cylinder 2 is similarly provided with a drain pipe 21 controlled by means of a valve 22 for removing the liquid contents of the cylinder after each operation.

Assuming now that a charge of sodium silicate is to be dissolved according to my improved method, the solid material is first charged into the chamber to a point below the top of the cylinder 7 around the agitator 4. Water is then run into the chamber 2 through the pipes 18 and 16 to any desired level, which will be adjacent to the top of the cylinder, after which the manhole is closed by the cover 14 and retaining means for the same firmly secured. Steam or other heating medium is then caused to circulate through the closed coil 17 until the pressure generated on the inside of the apparatus by the heat of this coil is within a few pounds of the pressure of the steam itself, and suitable gauges may be connected to the steam inlet pipe 15 and to the interior of the chamber 2 for determining these relative pressures. During this heating of the contents of the chamber 2 the agitator is run either continuously or intermittently a sufficient amount to provide a slow circulation of the material through the chamber 2 and thus thoroughly mix the water and solid matter therein. This agitation prevents the settling and accumulation of any impurities at the bottom of the machine as well as the formation of lumps which prevent free access of the solution of the solid material. The formation of lumps slows down the dissolving of the material and prevents accurate samplings of the contents of the apparatus.

After the pressure in the chamber 2 has been brought to approximately the pressure of the steam in the coil 17, steam, or, some other heating medium which is inert to the sodium silicate, is introduced through the lines 19 and 16 and thus brought directly in contact with the water and the sodium silicate suspended or dissolved therein. During this action of the steam on the contents of the chamber 2, which again raises the temperature of the materials therein, the agitator is operated sufficiently to provide the proper circulation of the materials through the chamber. This operation is continued until samples taken from the discharge pipe 21 show the degree of concentration desired, when the solution is drawn off through that connection, leaving in some cases undissolved material on the grill 12. This residue is of course treated in the next batch, and in ordinary operation it is not expected that one charge will be entirely dissolved at any one time, it being necessary ordinarily to add about three-fourths of the original charge after each operation as this gives satisfactory concentration of the solution.

Other modes of applying the principle of my invention may be employed instead of the one explained, change being made as regards the mechanism herein disclosed, provided the means stated by any of the following claims or the equivalent of such stated means may be employed.

I therefore particularly point out and distinctly claim as my invention:—

1. In apparatus of the character described, the combination of a cylindrical casing, a grill disposed thereacross adapted to maintain a finely divided material thereon, an open-ended conduit mounted longitudinally in said casing, and means adapted to cause a gentle circulation of solvent and material through said conduit and casing.

2. In apparatus of the character described, the combination of a cylindrical casing, a grill disposed thereacross adapted to maintain a finely divided material thereon, an open-ended conduit disposed longitudinally in said casing, said conduit being of relatively small cross sectional area compared to said casing, and means disposed in said conduit, said means being adapted to cause a gentle circulation therethrough from and into said casing.

3. In apparatus of the character described, the combination of a vertically disposed casing, a grill mounted transversely across said casing adjacent to the bottom thereof, said grill being adapted to prevent the passage of solid material therethrough, and means adapted to cause a circulation of liquid in said casing through said grill.

4. In apparatus of the character described, the combination of a vertically disposed casing, a grill mounted transversely across said casing adjacent to the bottom thereof, said grill being adapted to prevent the passage of solid material therethrough, a conduit extending through said grill in a vertical position, and means disposed in said conduit, said means being adapted to cause a gentle circulation of liquid upward through said conduit from the portion of said casing below said grill.

Signed by me, this 20th day of May, 1918.

EDWARD A. TAYLOR.